Sept. 17, 1929.   W. J. BARNES   1,728,195
DETACHABLE HANDLE FOR AGRICULTURAL IMPLEMENTS
Filed April 23, 1928
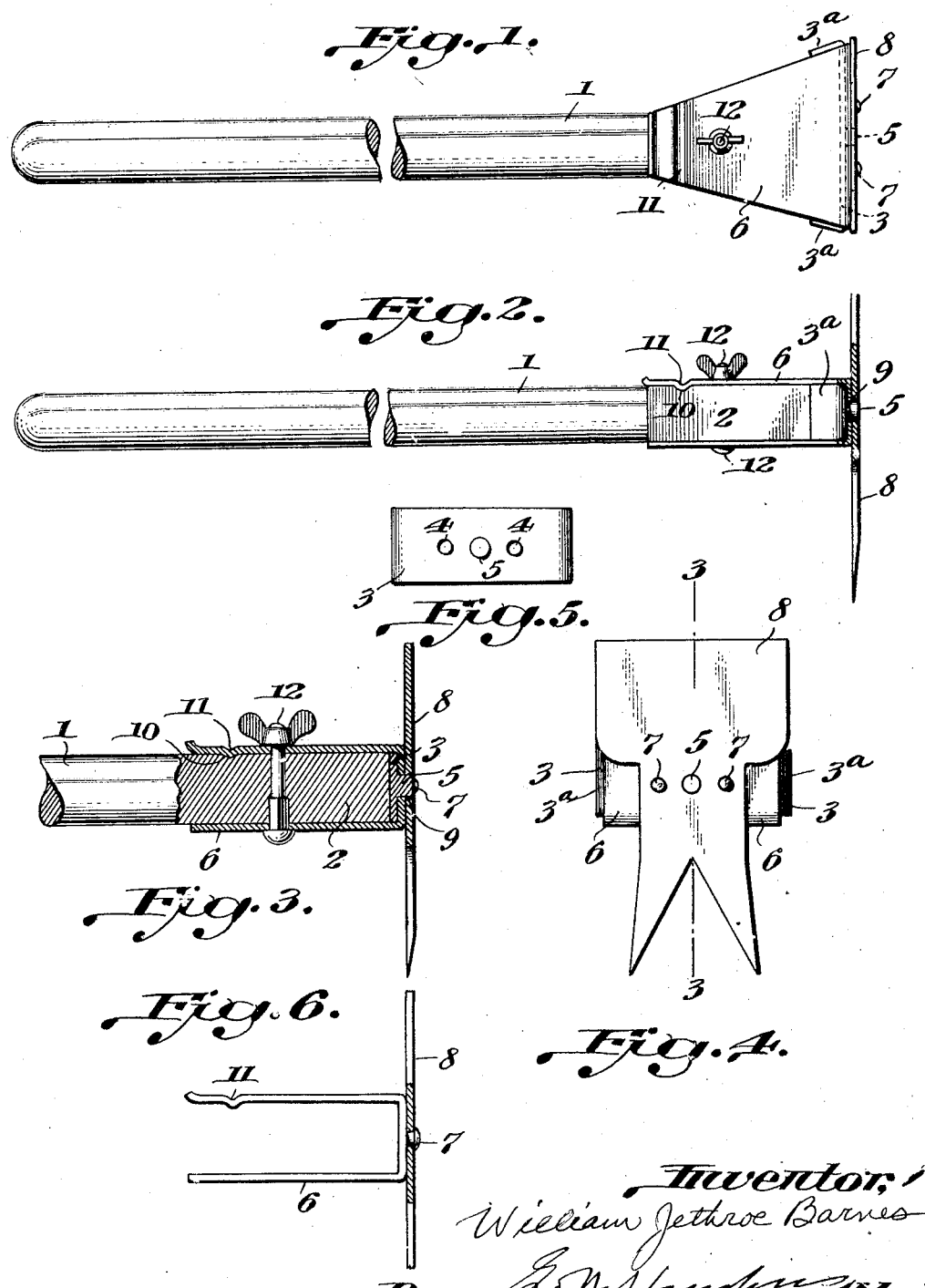

Patented Sept. 17, 1929

1,728,195

UNITED STATES PATENT OFFICE

WILLIAM JETHROE BARNES, OF EVANSVILLE, INDIANA, ASSIGNOR OF ONE-HALF TO JESSIE ALONZO PARKER, OF VANDERBURG COUNTY, INDIANA

DETACHABLE HANDLE FOR AGRICULTURAL IMPLEMENTS

Application filed April 23, 1928. Serial No. 272,284.

The object of the present invention is to provide an improved detachable handle for those agricultural implements such as hoes, hay forks, potato forks, scythes, post-hole diggers, and various other tools and implements, which are commonly used by farmers, whereby a single handle will serve for a variety of implements and tools when the latter are provided with attaching means according to my improvements.

One embodiment of the invention is set forth hereinafter and is shown in the accompanying drawings, in which Figure 1, is a plan view;

Fig. 2, is a side elevation, broken away;

Fig. 3, is a detail longitudinal section;

Fig. 4, is an end elevation;

Fig. 5, is a detail view of the head; and

Fig. 6, is a detail view of a hoe and its attaching clip, such as shown in the preceding figures.

In Figs. 1, 2, 3, 4, I have illustrated the complete implement, namely, the detachable handle and the unitary hoe and clip in position thereon. In Fig. 5, the attaching head is shown alone. In Fig. 6, the unitary hoe and double clip are shown.

While a hoe is illustrated, it will be understood that any other tool or implement may be provided with the improved double clip adapting it to be attached to, or detached from, the handle, according to the present invention.

The wooden handle 1 is provided with a flat end 2 across whose extremity extends a metal head 3 (Figs. 2, 3, 5) having holes 4 through which extend screws which enter the end 2 and permanently attach the head to said handle. The ends 3ᵃ of the head fit against the sides of the flat end 2 of the handle (Figs. 1, 2) and the handle end is thereby reinforced and strengthened to withstand the shocks to which it is subject when the implement is in use, thereby preventing splitting of the wood.

The head 3 has an outstanding lug 5 adapted to enter a hole in the hoe or other implement or tool when the latter is attached to the handle.

Each implement or tool designed for use in connection with the handle 1 is provided with a special double clip 6 attached thereto in any preferred manner. As shown, rivets 7 connect the clip 6 to the tool or implement which, in the present instance, is a double hoe 8. Thus, as shown in Fig. 6, the clip and the implement are unitary.

There is a hole 9 through the hoe and the clip which is adapted to receive the lug 5.

The clip 6 is of stiff, yet sufficiently springy metal, to adapt it to snap on and off of the flat end 2, and to frictionally engage the faces of said end. In some instances, for example with light implements or tools which are not intended to withstand heavy blows, the frictional engagement of the two parts of the clip with the faces of the end 2 is sufficient to retain the tool or implement on the handle, if the cross groove 10 is provided to receive the cross rib or bead 11 formed on the clip.

However, with tools or implements which have to stand considerable work and are subject to blows, it is preferable to employ a detachable cross bolt and nut such as shown at 12, the bolt passing through the end 2 and having a square part to prevent it from turning when in position.

The lug 5 locks the clip 6 and the implement 8 against lateral displacement from the handle 1.

With my improvements the same handle 1 and head 3 can be used at different times with any tool or implement provided with the clip 6 and, if necessary, with the bolt 12, thus enabling the user to easily carry about with him a number of implements and tools needed for different purposes at some distant point, without having to carry a separate handle for each of said tools or implements.

What I claim is:

1. A detachable handle for tools and implements, provided with a metal head fastened to its end and having a projecting lug adapted to engage the tool or implement, in combination with an implement provided with a double clip which detachably embraces the end of said handle and has an opening which receives the aforesaid lug, and means for fastening the clip to the handle.

2. A detachable handle for tools and implements, provided with a metal head fastened to its end and having a projecting lug, the ends of said metal head being engaged with the sides of the handle and reinforcing the latter, in combination with an implement provided with a double clip which detachably embraces the end of said handle and has an opening which receives the aforesaid lug, and means for fastening the clip to the handle.

3. The combination with a handle, of a tool or implement provided with a double clip adapted to detachably embrace the end of said handle, the handle having a cross-groove, and the clip having a cross bead or rib adapted to enter said cross groove.

4. The combination with a handle having a flattened end provided with a cross-groove in one of its faces, of a head secured to, and embracing, the extremity of said flattened end and provided with a lug, and a tool or implement provided with a double-clip having a cross bead or rib adapted to enter the cross-groove aforesaid when said clip receives the flattened end aforesaid, said implement having an opening adapted to receive the lug.

In testimony whereof I affix my signature.

WILLIAM JETHROE BARNES.